US012243692B2

(12) United States Patent
Okuda et al.

(10) Patent No.: US 12,243,692 B2
(45) Date of Patent: *Mar. 4, 2025

(54) MULTILAYER CERAMIC CAPACITOR

(71) Applicant: Murata Manufacturing Co., Ltd., Nagaokakyo (JP)

(72) Inventors: Hikaru Okuda, Nagaokakyo (JP); Toshihiro Harada, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/400,411

(22) Filed: Dec. 29, 2023

(65) Prior Publication Data
US 2024/0194411 A1 Jun. 13, 2024

Related U.S. Application Data

(63) Continuation of application No. 17/835,277, filed on Jun. 8, 2022, now Pat. No. 11,894,198.

(30) Foreign Application Priority Data

Jul. 29, 2021 (JP) .................. 2021-124034

(51) Int. Cl.
*H01G 4/30* (2006.01)
*H01G 4/008* (2006.01)
*H01G 4/012* (2006.01)
*H01G 4/12* (2006.01)

(52) U.S. Cl.
CPC ............... *H01G 4/30* (2013.01); *H01G 4/008* (2013.01); *H01G 4/012* (2013.01); *H01G 4/1227* (2013.01)

(58) Field of Classification Search
None
See application file for complete search history.

(56) References Cited

U.S. PATENT DOCUMENTS 11,894,198 B2 * 2/2024 Okuda ................. H01G 4/1227

OTHER PUBLICATIONS

Okuda et al., "Multilayer Ceramic Capacitor", U.S. Appl. No. 17/835,277, filed Jun. 8, 2022.

* cited by examiner

*Primary Examiner* — Dion R. Ferguson
(74) *Attorney, Agent, or Firm* — Keating & Bennett, LLP

(57) ABSTRACT

A multilayer ceramic capacitor includes a multilayer body including dielectric layers and internal electrode layers stacked together, and external electrodes. The multilayer body includes an inner layer portion and outer layer portions in a stacking direction, and an electrode opposing portion and gap portions in a length direction. The multilayer body further includes conductor portions in the two outer layer portions in the gap portions, and each includes conductor layers stacked in the stacking direction. One of that conductor layers that is closest to a middle in the stacking direction of the multilayer body is closer to the middle in the stacking direction of the multilayer body than another of the internal electrode layers closest in the stacking direction to a main surface of the multilayer body.

8 Claims, 4 Drawing Sheets

MULTILAYER CERAMIC CAPACITOR

CROSS REFERENCE TO RELATED APPLICATIONS

This application claims the benefit of priority to Japanese Patent Application No. 2021-124034 filed on Jul. 29, 2021, and U.S. patent application Ser. No. 17/835,277 filed on Jun. 8, 2022. The entire contents of these applications are hereby incorporated herein by reference.

BACKGROUND OF THE INVENTION

1. Field of the Invention

The present invention relates to a multilayer ceramic capacitor.

2. Description of the Related Art

Japanese Unexamined Patent Application Publication No. 2016-76582 discloses a multilayer ceramic capacitor. Such a multilayer ceramic capacitor includes a multilayer body including a plurality of dielectric layers of a ceramic material and a plurality of internal electrode layers that are stacked together, and external electrodes provided on end surfaces of the multilayer body.

A multilayer ceramic capacitor of this type may experience ingress of moisture into the multilayer body from an end of the external electrode. If such moisture penetrates to reach the internal electrode layers of the multilayer body, the electric characteristics of the capacitor are deteriorated.

SUMMARY OF THE INVENTION

Preferred embodiments of the present invention provide multilayer ceramic capacitors having improved moisture resistance.

A multilayer ceramic capacitor according to a preferred embodiment of the present invention includes a multilayer body including a plurality of dielectric layers and a plurality of internal electrode layers that are stacked together in a stacking direction, a first surface and a second surface facing each other in the stacking direction, a third surface and a fourth surface facing each other in a width direction orthogonal or substantially orthogonal to the stacking direction, and a fifth surface and a sixth surface facing each other in a length direction orthogonal or substantially orthogonal to the stacking direction and the width directions, and external electrodes respectively on the fifth surface and the sixth surface. The plurality of internal electrode layers include first internal electrode layers and second internal electrode layers, the first internal electrode layers being connected to the external electrode on the fifth surface, the second internal electrode layers being connected to the external electrode on the sixth surface, the multilayer body includes an inner layer portion including the plurality of the internal electrode layers opposed to each other in the stacking direction with one of the dielectric layers interposed therebetween, and outer layer portions sandwiching the inner layer portion therebetween in the stacking direction, the inner layer portion includes an electrode opposing portion and gap portions, the electrode opposing portion being where the first internal electrode layers and the second internal electrode layers face each other in the stacking direction, the gap portions each being located between the electrode opposing portion and the outer layer portions, and the fifth surface and the sixth surface in the length direction, and the multilayer body includes conductor portions respectively provided in the outer layer portions corresponding to the gap portions in the stacking direction, each of the conductor portions includes a plurality of conductor layers stacked in the stacking direction, and one of the plurality of conductor layers at a middle or approximate middle of the multilayer body in the stacking direction includes at least a portion located closer to the middle or approximate middle of the multilayer body in the stacking direction than one of the plurality of internal electrode layers adjacent to one of the outer layer portions of the multilayer body in the stacking direction.

Preferred embodiments of the present invention are each able to improve moisture resistance of the multilayer ceramic capacitor.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
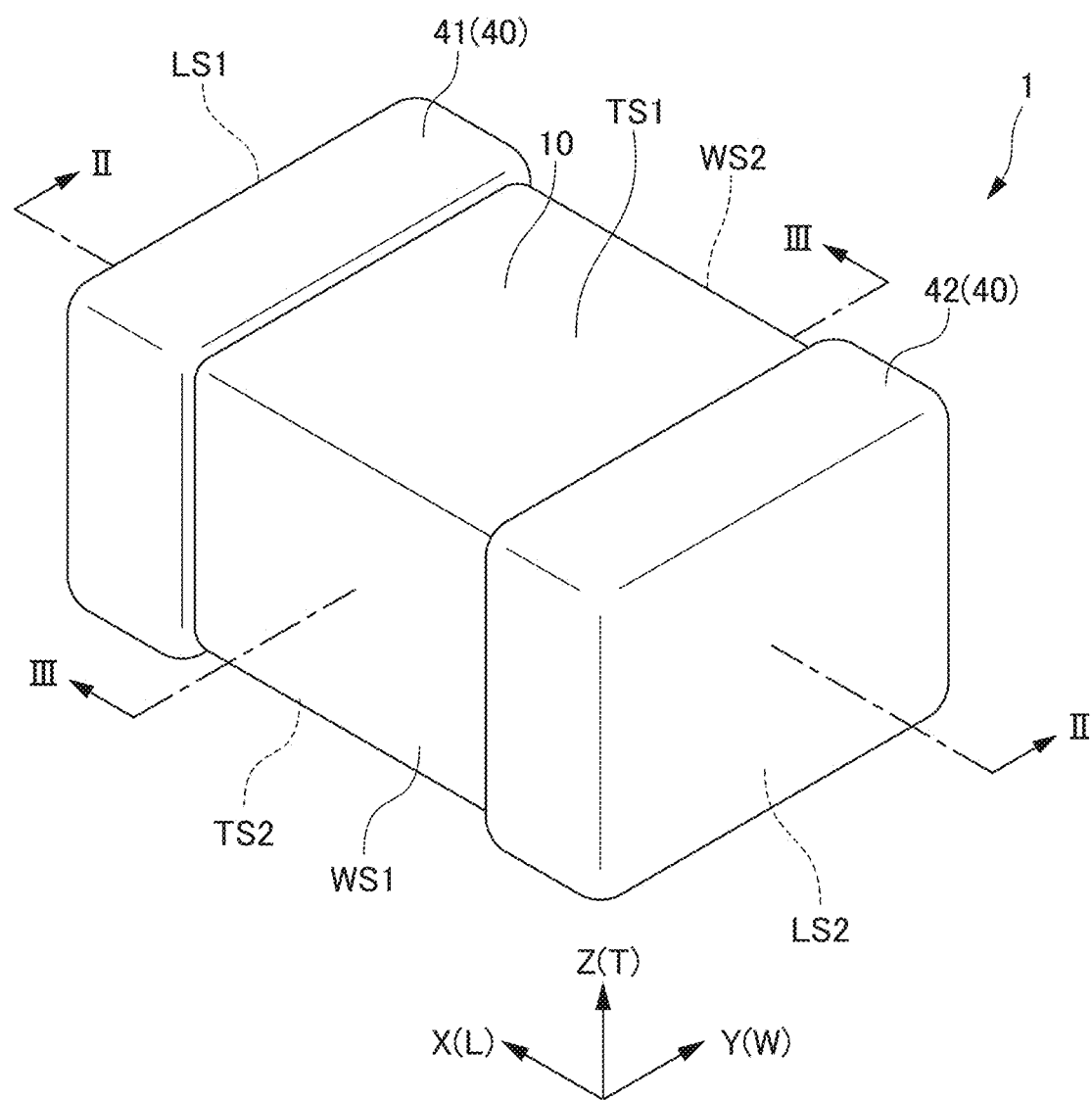
FIG. 1 is a perspective view illustrating a multilayer ceramic capacitor according to a preferred embodiment of the present invention.

Preferred embodiments of the present invention will be described below with reference to the accompanying drawings. The same or corresponding reference characters are used for the same or corresponding portions and elements in the drawings.

Multilayer Ceramic Capacitor

Figure 2:
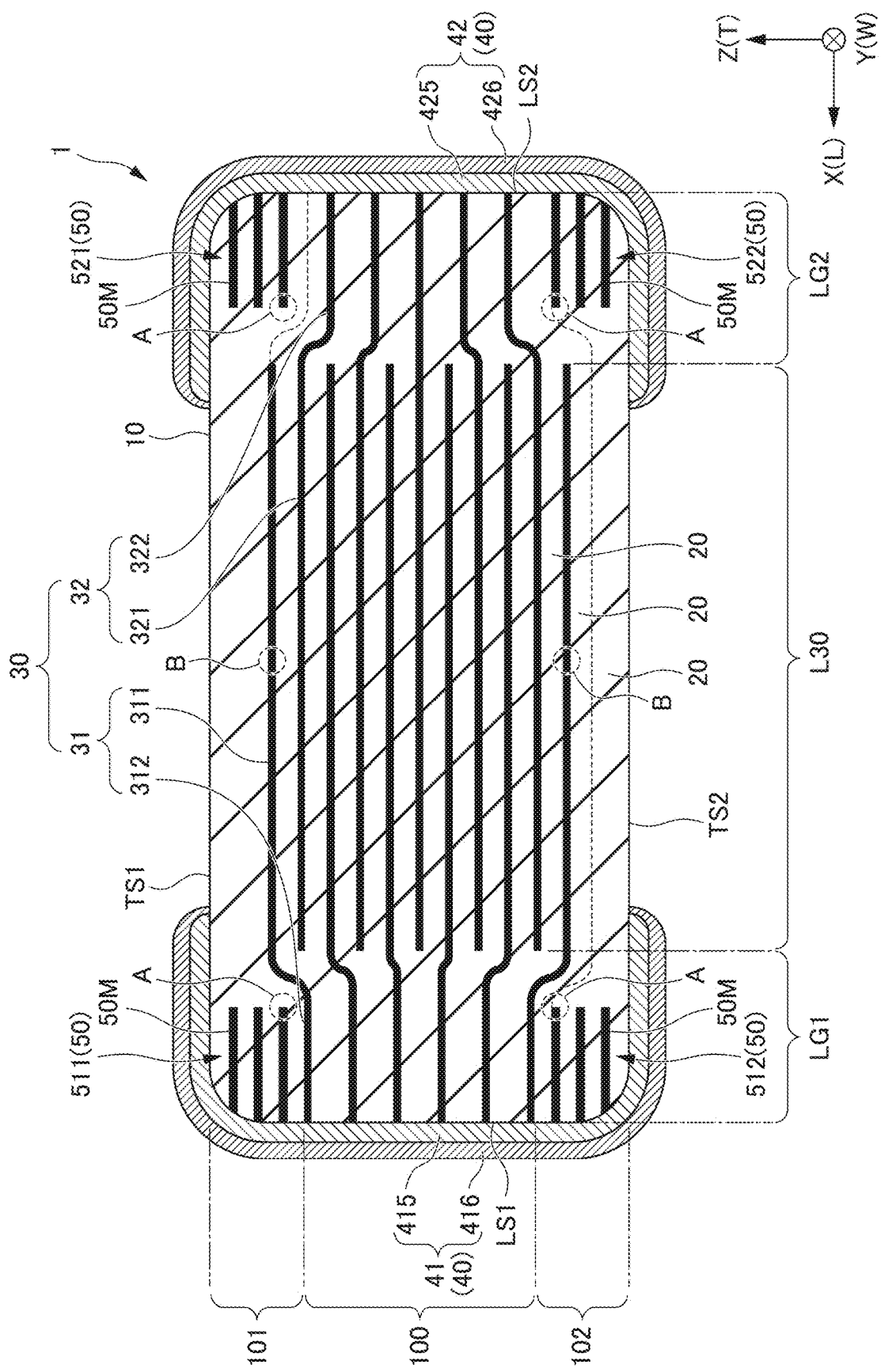
FIG. 2 is a cross-sectional view taken along line II-II of an LT cross section of the multilayer ceramic capacitor illustrated in FIG. 1.
Figure 3:
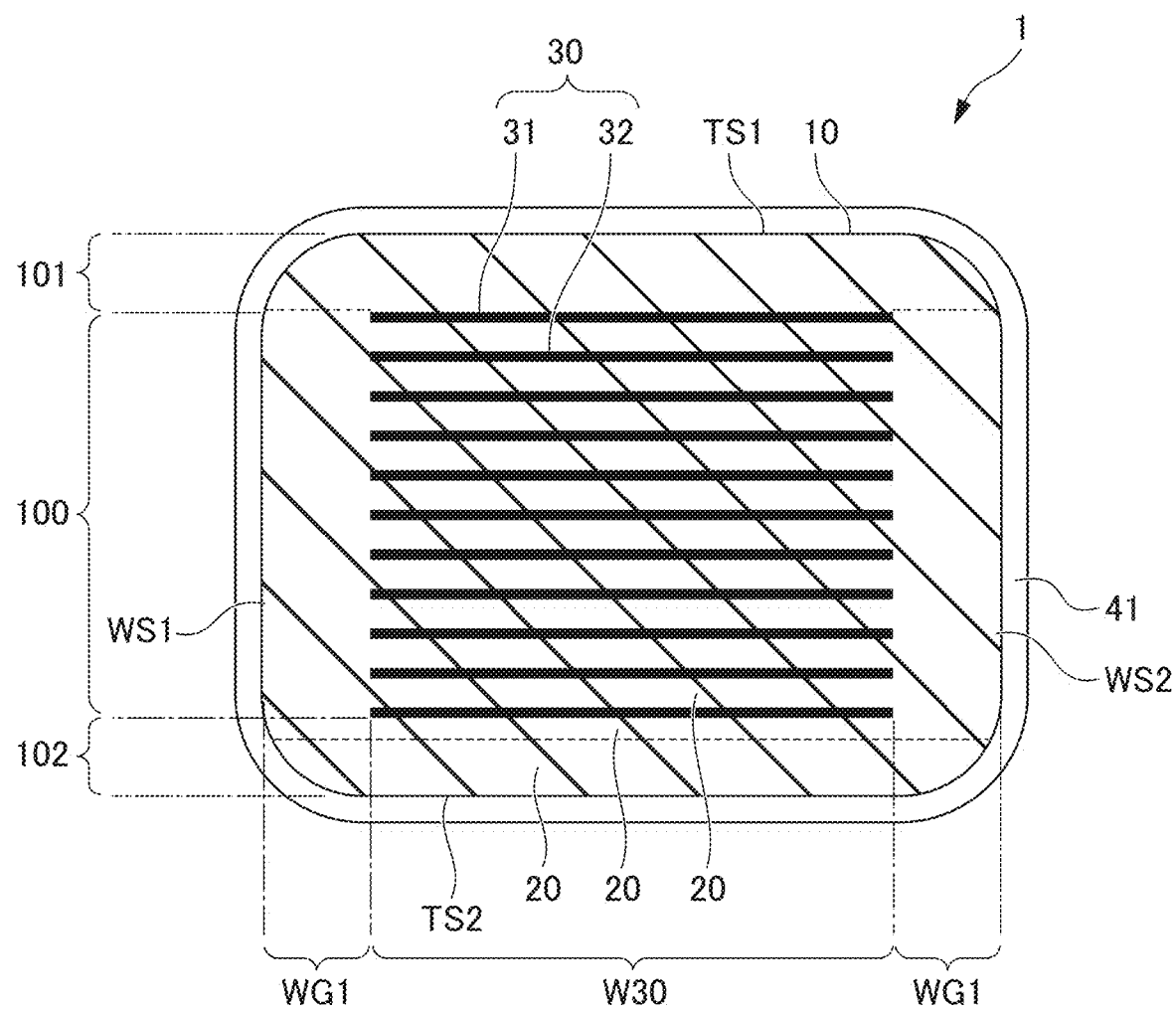
FIG. 3 is a cross-sectional view taken along line III-III of a WT cross section of the multilayer ceramic capacitor illustrated in FIG. 1.

FIG. 1 is a perspective view illustrating a multilayer ceramic capacitor according to the present preferred embodiment of the present invention. FIG. 2 is a cross-sectional view taken along line II-II of the multilayer ceramic capacitor illustrated in FIG. 1. FIG. 3 is a cross-sectional view taken along line III-III of the multilayer ceramic capacitor illustrated in FIG. 1. The multilayer ceramic capacitor 1 illustrated in FIGS. 1 to 3 includes a multilayer body 10 and external electrodes 40. The external electrodes 40 include a first external electrode 41 and a second external electrode 42.

In FIGS. 1 to 3, an XYZ orthogonal coordinate system is shown. The X direction refers to the length direction L of the multilayer ceramic capacitor 1 and the multilayer body 10, the Y direction refers to the width direction W of the multilayer ceramic capacitor 1 and the multilayer body 10, and the Z direction refers to the stacking direction T of the multilayer ceramic capacitor 1 and the multilayer body 10. Accordingly, the cross section illustrated in FIG. 2 is referred to also as the LT cross section, and the cross section illustrated in FIG. 3 is referred to also as the WT cross section.

The length direction L, the width direction W, and the stacking direction T are not necessarily in a relationship orthogonal or substantially orthogonal to one another, and may be in a relationship transverse to each other.

The multilayer body 10 has a rectangular or substantially rectangular parallelepiped shape, and includes a first main surface TS1 and a second main surface TS2 facing each other in the stacking direction T, a first side surface WS1 and a second side surface WS2 facing each other in the width direction W, and a first end surface LS1 and a second end surface LS2 facing each other in the length direction L.

It is preferable that the multilayer body 10 includes rounded corner portions and rounded ridgeline portions. The corner portions are where three of the surfaces of the multilayer body 10 meet transversely to each other, and the ridgeline portions are where two of the surfaces of the multilayer body 10 meet transversely to each other.

As illustrated in FIGS. 2 and 3, the multilayer body 10 includes a plurality of dielectric layers 20, a plurality of internal electrode layers 30, and a plurality of conductor portions 50 that are stacked in the stacking direction T. The multilayer body 10 further includes, in the stacking direction T, an inner layer portion 100, and a first outer layer portion 101 and a second outer layer portion 102 sandwiching the inner layer portion 100.

The inner layer portion 100 includes some of the plurality of dielectric layers 20 and the plurality of internal electrode layers 30. In the inner layer portion 100, the plurality of internal electrode layers 30 face each other with the dielectric layers 20 interposed therebetween. The inner layer portion 100 generates a capacitance and defines or functions as a capacitor.

The first outer layer portion 101 is disposed adjacent to the first main surface TS1 of the multilayer body 10, and the second outer layer portion 102 is disposed adjacent to the second main surface TS2 of the multilayer body 10. More specifically, the first outer layer portion 101 is disposed between the first main surface TS1 and one internal electrode layer 30 closest to the first main surface TS1 among the plurality of internal electrode layers 30, and the second outer layer portion 102 is disposed between the second main surface TS2 and one internal electrode layer 30 closest to the second main surface TS2 among the plurality of internal electrode layers 30. The first outer layer portion 101 and the second outer layer portion 102 do not include any of the plurality of internal electrode layers 30, but include the remainder of the plurality of dielectric layers 20 other than those included in the inner layer portion 100. The first outer layer portion 101 and the second outer layer portion 102 each define and function as a protective layer to protect the inner layer portion 100. Furthermore, the first outer layer portion 101 and the second outer layer portion 102 each include the plurality of conductor portions 50.

Examples of the material for the dielectric layer 20 include a dielectric ceramic including $BaTiO_3$, $CaTiO_3$, $SrTiO_3$, $CaZrO_3$, or the like as a main component. Furthermore, the material for the dielectric layer 20 may additionally include, for example, Mn compound, a Fe compound, a Cr compound, a Co compound, a Ni compound, or the like, as a sub-component.

The thickness of the dielectric layer 20 is not particular limited, but is preferably about 0.40 μm or more and about 0.60 μm or less, for example, from the viewpoint of moisture resistance and from the viewpoint of reducing a level difference between an electrode opposing portion L30 and a first end gap portion LG1 and a level difference between the electrode opposing portion L30 and a second end gap portion LG2, as will be described later. The number of the dielectric layers 20 is not particularly limited, but is preferably 132 or more and 140 or less, for example, from the viewpoint of moisture resistance and from the viewpoint of reducing the level difference between the electrode opposing portion L30 and the first end gap portion LG1 and the level difference between the electrode opposing portion L30 and the second end gap portion LG2, as will be described later. The number of the dielectric layers 20 is the sum total of the number of the dielectric layers in the inner layer portion and the number of the dielectric layers in the outer layer portions.

The plurality of internal electrode layers 30 include a plurality of first internal electrode layers 31 and a plurality of second internal electrode layers 32. The plurality of first internal electrode layers 31 and the plurality of second internal electrode layers 32 are alternately arranged in the stacking direction T of the multilayer body 10.

Each first internal electrode layer 31 includes a counter electrode portion 311 and a lead-out electrode portion 312, and each second internal electrode layer 32 includes a counter electrode portion 321 and a lead-out electrode portion 322.

The counter electrode portion 311 and the counter electrode portion 321 face each other with the dielectric layer 20 interposed therebetween in the stacking direction T of the multilayer body 10. The counter electrode portion 311 and the counter electrode portion 321 may have any shape, and it is satisfactory for them to have, for example, a rectangular or substantially rectangular shape. The counter electrode portions 311 and the counter electrode portions 321 generate a capacitance and define or function as a capacitor.

The lead-out electrode portion 312 extends to the first end surface LS1 of the multilayer body 10 from the counter electrode portion 311, and is exposed at the first end surface LS1. The lead-out electrode portion 322 extends to the second end surface LS2 of the multilayer body 10 from the counter electrode portion 321, and is exposed at the second end surface LS2. The lead-out electrode portion 312 and the lead-out electrode portion 322 may have any shape, and it is satisfactory for them to have, for example, a rectangular or substantially rectangular shape.

Due to the configuration described above, the first internal electrode layers 31 are connected to the first external electrode 41 and are separated from the second end surface LS2 of the multilayer body 10, that is, from the second external electrode 42 with a gap existing therebetween. The second internal electrode layers 32 are connected to the second external electrode 42 and are separated from the first end surface LS1 of the multilayer body 10, that is, from the first external electrode 41, with a gap existing therebetween.

The first internal electrode layers 31 and the second internal electrode layers 32 include, for example, Ni as a main component. Furthermore, the first internal electrode layers 31 and the second internal electrode layers 32 may include, for example, at least one selected from metals such as Cu, Ag, Pd, and Au, or an alloy including at least one of these metals such as a Ag—Pd alloy, as the main component, or may include at least one of these as a component other than the main component. Furthermore, the first internal electrode layers 31 and the second internal electrode layers 32 may include dielectric particles having the same composition as that of the ceramic included in the dielectric layers 20, as a component other than the main component. In the present disclosure, a metal which is the main component is defined as the metal component having the highest weight percent.

The thickness of the first internal electrode layer 31 and that of the second internal electrode layer 32 are not particularly limited, but are preferably about 0.25 µm or more and about 0.45 µm or less, for example, from the viewpoint of moisture resistance and from the viewpoint of reducing the level difference between the electrode opposing portion L30 and the first end gap portion LG1 and the level difference between the electrode opposing portion L30 and the second end gap portion LG2, as will be described later. The number of the first internal electrode layers 31 and number of the second internal electrode layers 32 are not particularly limited, but is preferably 115 or more and 125 or less, for example, from the viewpoint of moisture resistance and from the viewpoint of reducing the level difference between the electrode opposing portion L30 and the first end gap portion LG1 and the level difference between the electrode opposing portion L30 and the second end gap portion LG2, as will be described later.

As illustrated in FIG. 3, the multilayer body 10 includes, in the width direction W, an electrode opposing portion W30 in which the internal electrode layers 30 face each other, and a first side gap portion WG1 and a second side gap portion WG2 sandwiching the electrode opposing portion W30 therebetween. The first side gap portion WG1 is located between the electrode opposing portion W30 and the first side surface WS1, and the second side gap portion WG2 is located between the electrode opposing portion W30 and the second side surface WS2. More specifically, the first side gap portion WG1 is located between the first side surface WS1 and the ends of the internal electrode layers 30 adjacent to the first side surface WS1. The second side gap portion WG2 is located between the second side surface WS2 and the ends of the internal electrode layers 30 adjacent to the second side surface WS2. The first side gap portion WG1 and the second side gap portion WG2 do not include any of the internal electrode layers 30, but include only the dielectric layers 20. The first side gap portion WG1 and the second side gap portion WG2 define and function as protective layers to protect the internal electrode layers 30. The first side gap portion WG1 and the second side gap portion WG2 are referred to also as W gaps.

As illustrated in FIG. 2, the multilayer body 10 includes, in the length direction L, the electrode opposing portion L30 where the first internal electrode layers 31 and the second internal electrode layers 32 of the internal electrode layers 30 face each other, the first end gap portion LG1, and the second end gap portion LG2. The first end gap portion LG1 is located between the electrode opposing portion L30 and the first end surface LS1, and the second end gap portion LG2 is located between the electrode opposing portion L30 and the second end surface LS2. More specifically, the first end gap portion LG1 is located between the first end surface LS1 and the ends of the second internal electrode layers 32 adjacent to the first end surface LS1. The second end gap portion LG2 is located between the second end surface LS2 and the ends of the first internal electrode layers 31 adjacent to the second end surface LS2. The first end gap portion LG1 does not include the second internal electrode layers 32, but includes the first internal electrode layers 31 and the dielectric layers 20. The second end gap portion LG2 does not include the first internal electrode layers 31, but includes the second internal electrode layers 32 and the dielectric layers 20. The first end gap portion LG1 defines and functions as a lead-out electrode portion of the first internal electrode layers 31 to the first end surface LS1, and the second end gap portion LG2 defines and functions as a lead-out electrode portion of the second internal electrode layers 32 to the second end surface LS2. The first end gap portion LG1 and the second end gap portion LG2 are referred to also as L gaps.

The electrode opposing portion L30 is where the above-described counter electrode portions 311 of the first internal electrode layers 31 and the above-described counter electrode portions 321 of the second internal electrode layers 32 are located. The first end gap portion LG1 is where the above-described lead-out electrode portions 312 of the first internal electrode layers 31 are located, and the second end gap portion LG2 is where the above-described lead-out electrode portions 322 of the second internal electrode layers 32 are located.

The plurality of conductor portions 50 include first conductor portions 511 and 512 and second conductor portions 521 and 522.

The first conductor portion 511 is provided in the first outer layer portion 101 in the first end gap portion LG1, and the first conductor portion 512 is provided in the second outer layer portion 102 in the first end gap portion LG1. The second conductor portion 521 is provided in the first outer layer portion 101 in the second end gap portion LG2, and the second conductor portion 522 is provided in the second outer layer portion 102 in the second end gap portion LG2.

The first conductor portions 511 and 512 and the second conductor portions 521 and 522 each include a plurality of conductor layers 50M. The conductor layers 50M may have any shape, and it is satisfactory for them to have, for example, a rectangular or substantially rectangular shape. The plurality of conductor layers 50M are stacked in the stacking direction T with the dielectric layers 20 interposed therebetween.

During a step of pressing the multilayer body 10, the first conductor portions 511 and 512 pressurize and move the inner layer portion 100 in the first end gap portion LG1, that is, the internal electrode layers 30 in the first end gap portion LG1, toward the middle in the stacking direction T of the multilayer body 10. During the step of pressing the multilayer body 10, the second conductor portions 521 and 522 pressurize and move the inner layer portion 100 in the second end gap portion LG2, that is, the internal electrode layers 30 in the second end gap portion LG2, toward the middle in the stacking direction T of the multilayer body 10.

Thus, as to the first conductor portion 511, one conductor layer 50M closest to the middle in the stacking direction T of the multilayer body 10 among the plurality of conductor layers 50M is closer to the middle in the stacking direction T of the multilayer body 10 than one internal electrode layer 30 closest in the stacking direction T to the first main surface TS1 of the multilayer body 10 among the plurality of internal electrode layers 30. More specifically, in the first conductor portion 511, the one conductor layer 50M closest to the middle in the stacking direction T of the multilayer body 10 includes one end portion A located toward the electrode opposing portion L30, and the one end portion A is closer to the middle in the stacking direction T of the multilayer body 10 than a middle portion B in the length direction L of the one internal electrode layer 30 closest to the first main surface TS1.

Regarding the first conductor portion 512, one conductor layer 50M closest to the middle in the stacking direction T of the multilayer body 10 among the plurality of conductor layers 50M is closer to the middle in the stacking direction T of the multilayer body 10 than one internal electrode layer 30 closest in the stacking direction T to the second main surface TS2 of the multilayer body 10 among the plurality of internal electrode layers 30. More specifically, in the first conductor portion 512, the one conductor layer 50M closest to the middle in the stacking direction T of the multilayer body 10 has one end portion A located toward the electrode opposing portion L30, and the one end portion A is closer to the middle in the stacking direction T of the multilayer body 10 than a middle portion B in the length direction L of the one internal electrode layer 30 closest to the second main surface TS2.

Regarding the second conductor portion 521, one conductor layer 50M closest to the middle in the stacking direction T of the multilayer body 10 among the plurality of conductor layers 50M is closer to the middle in the stacking direction T of the multilayer body 10 than the one internal electrode layer 30 closest in the stacking direction T to the first main surface TS1 of the multilayer body 10 among the plurality of internal electrode layers 30. More specifically, in the second conductor portion 521, the one conductor layer 50M closest to the middle in the stacking direction T of the multilayer body 10 has one end portion A located toward the electrode opposing portion L30, and the one end portion A is closer to the middle in the stacking direction T of the multilayer body 10 than the middle portion B in the length direction L of the one internal electrode layer 30 closest to the first main surface TS1.

Regarding the second conductor portion 522, one conductor layer 50M closest to the middle in the stacking direction T of the multilayer body 10 among the plurality of conductor layers 50M is closer to the middle in the stacking direction T of the multilayer body 10 than the one internal electrode layer 30 closest in the stacking direction T to the second main surface TS2 of the multilayer body 10 among the plurality of internal electrode layers 30. More specifically, in the second conductor portion 522, the one conductor layer 50M closest to the middle in the stacking direction T of the multilayer body 10 has one end portion A located toward the electrode opposing portion L30, and the one end portion A is closer to the middle in the stacking direction T of the multilayer body 10 than the middle portion B in the length direction L of the one internal electrode layer 30 closest to the second main surface TS2.

The conductor layers 50M of the first conductor portions 511 and 512 include end portions spaced away from the electrode opposing portion L30, and these end portions are exposed at the first end surface LS1 and connected to the first external electrode 41. The conductor layers 50M of the second conductor portions 521 and 522 include end portions spaced away from the electrode opposing portion L30, and these end portions are exposed at the second end surface LS2 and connected to the second external electrode 42.

In the first conductor portion 511, some of the plurality of conductor layers 50M may be disposed at the rounded ridgeline portion where the first main surface TS1 and the first end surface LS1 of the stacked body 10 meet. In the first conductor portion 512, some of the plurality of conductor layers 50M may be disposed at the rounded ridgeline portion where the second main surface TS2 and the first end surface LS1 of the stacked body 10 meet. In the second conductor portion 521, some of the plurality of conductor layers 50M may be disposed at the rounded ridgeline portion where the first main surface TS1 and the second end surface LS2 of the stacked body 10 meet. In the second conductor portion 522, some of the plurality of conductor layers 50M may be disposed at the rounded ridgeline portion where the second main surface TS2 and the second end surface LS2 of the stacked body 10 meet.

The material for the conductor layers 50M is not particularly limited, but may be, for example, the same as the material for the internal electrode layers 30.

In each of the first conductor portions 511 and 512 and the second conductor portions 521 and 522, the thickness of each of the plurality of conductor layers 50M is not particularly limited, but is preferably about 6 µm or more and about 10 µm or less, for example, from the viewpoint of moisture resistance and from the viewpoint of reducing the level difference between the electrode opposing portion L30 and the first end gap portion LG1 and the level difference between the electrode opposing portion L30 and the second end gap portion LG2, as will be described later. In each of the first conductor portions 511 and 512 and the second conductor portions 521 and 522, the number of the plurality of conductor layers 50M is not particularly limited, but is preferably 6 or more and 10 or less, for example, from the viewpoint of moisture resistance and from the viewpoint of reducing the level difference between the electrode opposing portion L30 and the first end gap portion LG1 and the level difference between the electrode opposing portion L30 and the second end gap portion LG2, as will be described later.

The dimensions of the multilayer body 10 described above are not particularly limited, but are preferably set as follows, from the viewpoint of moisture resistance and from the viewpoint of reducing the level difference between the electrode opposing portion L30 and the first end gap portion LG1 and the level difference between the electrode opposing portion L30 and the second end gap portion LG2, as will be described below. It is preferable, for example, that the length in the length direction L is about 250 µm #10 µm, i.e., about 0.24 mm or more and about 0.26 mm or less, the width in the width direction W is about 125 µm±10 µm, i.e., about 0.115 mm or more and about 0.135 mm or less, and the thickness in the stacking direction T is about 125 µm±10 µm, i.e., about 0.115 mm or more and about 0.135 mm or less.

The thicknesses of the dielectric layer 20, the internal electrode layer 30, and the conductor layer 50M can be measured by, for example, a method in which an LT cross section in the vicinity of the middle in the width direction of the multilayer body is polished to be exposed, and is observed using a scanning electron microscope. Each of the thicknesses may be the average of values measured at a plurality of locations in the length direction, or may be the average of values measured at a plurality of locations in the stacking direction.

Similarly, the level differences between the electrode opposing portion L30 and the end gap portions LG1 and LG2 of the multilayer body 10 can be measured by, for example, a method in which an LT cross section in the vicinity of the middle in the width direction of the multilayer body 10 is polished to be exposed, and is observed using a scanning electron microscope.

Similarly, the thicknesses of the multilayer body 10 can be measured by, for example, a method in which an LT cross section in the vicinity of the middle in the width direction of the multilayer body or a WT cross section in the vicinity of the middle in the length direction of the multilayer body is polished to be exposed, and is observed using a scanning electron microscope. The thickness of the multilayer body 10 may be the average of values measured at a plurality of locations in the length direction or the width direction. Likewise, the length of the multilayer body 10 can be measured by, for example, a method in which an LT cross section in the vicinity of the middle in the width direction of the multilayer body is polished to be exposed, and is observed using a scanning electron microscope. The length of the multilayer body 10 may be the average of values measured at a plurality of locations in the stacking direction. Similarly, the width of the multilayer body 10 can be measured by, for example, a method of observing a polished and exposed WT cross section of the vicinity of the middle in the length direction of the multilayer body, using a scanning electron microscope. The width of the multilayer body 10 may be the average of values measured at a plurality of locations in the stacking direction.

The external electrodes 40 include the first external electrode 41 and the second external electrode 42.

The first external electrode 41 is disposed on the first end surface LS1 of the multilayer body 10, and is connected to the first internal electrode layers 31. The first external electrode 41 may extend from the first end surface LS1 to a portion of the first main surface TS1 and a portion of the second main surface TS2. Furthermore, the first external electrode 41 may extend from the first end surface LS1 to a portion of the first side surface WS1 and a portion of the second side surface WS2.

The second external electrode 42 is disposed on the second end surface LS2 of the multilayer body 10, and is connected to the second internal electrode layers 32. The second external electrode 42 may extend from the second end surface LS2 to a portion of the first main surface TS1 and a portion of the second main surface TS2. Furthermore, the second external electrode 42 may extend from the second end surface LS2 to a portion of the first side surface WS1 and a portion of the second side surface WS2.

The first external electrode 41 includes a first base electrode layer 415 and a first plated layer 416, and the second external electrode 42 includes a second base electrode layer 425 and a second plated layer 426.

The first base electrode layer 415 and the second base electrode layer 425 may each be, for example, a fired layer including metal and glass. The glass may be a glass component including at least one selected from B, Si, Ba, Mg, Al, Li, and the like, for example. As a specific example, borosilicate glass may be used. The metal includes, for example, Cu as a main component. Furthermore, the metal may include, for example, at least one selected from metals such as Ni, Ag, Pd, and Au, or an alloy such as a Ag—Pd alloy, as the main component or as a component other than the main component.

The fired layer is produced by applying a conductive paste including metal and glass to the multilayer body by a dipping method, and firing the applied conductive paste. The applied conductive paste may be fired after or at the same time as firing the internal electrode layers. The fired layer may include a plurality of layers.

Alternatively, the first base electrode layer 415 and the second base electrode layer 425 may each be, for example, a resin layer including conductive particles and a thermosetting resin. The resin layer may be provided on the above-described fired layer, or may be provided directly on the multilayer body without formation of the fired layer.

The resin layer is produced by applying a conductive paste including conductive particles and a thermosetting resin to the multilayer body by, for example, a coating method and firing the applied conductive paste. The applied conductive paste may be fired after or at the same time as firing the internal electrode layers. The resin layer may include a plurality of layers.

The per-layer thicknesses of the first base electrode layer 415 and the second base electrode layer 425 provided as the fired layers or the resin layers are not particularly limited, and may be, for example, about 1 μm or more and about 10 μm or less.

Alternatively, the first base electrode layer 415 and the second base electrode layer 425 may each be a thin film layer that has a thickness of, for example, about 1 μm or less, includes deposited metal particles, and is formed by, for example, a thin film formation method such as sputtering or vapor deposition.

The first plated layer 416 covers at least a portion of the first base electrode layer 415, and the second plated layer 426 covers at least a portion of the second base electrode layer 425. The first plated layer 416 and the second plated layer 426 include, for example, at least one selected from metals such as Cu, Ni, Ag, Pd and Au, or an alloy such as an Ag—Pd alloy.

Each of the first plated layer 416 and the second plated layer 426 may include a plurality of layers. Each of the first plated layer 416 and the second plated layer 426 preferably has a two-layer structure including a Ni plated layer and a Sn plated layer, for example. The Ni plated layer prevents the base electrode layer from being eroded by solder when a ceramic electronic component is mounted, and the Sn plated layer improves the wettability of the solder when the ceramic electronic component is mounted, thereby enabling easy mounting.

The per-layer thicknesses of the first plated layer 416 and the second plated layer 426 are not particularly limited, and may be, for example, about 1 μm or more and about 10 μm or less.

Manufacturing Method

Next, a non-limiting example of a method of manufacturing the multilayer ceramic capacitor 1 described above will be described. First, dielectric sheets for forming the dielectric layers 20, a conductive paste for forming the internal electrode layers 30, and a conductive paste for forming the conductor layers 50M are prepared. The dielectric sheets and the conductive pastes include a binder and a solvent. As the binder and the solvent, known materials can be used.

Next, the conductive paste is printed in, for example, predetermined patterns on the dielectric sheets to form internal electrode patterns on the dielectric sheets. Furthermore, the conductive paste is printed in, for example, predetermined patterns on the dielectric sheets, to form conductor patterns on the dielectric sheets. The internal electrode patterns and the conductor patterns can be formed by a method such as, for example, screen printing, gravure printing, or the like.

Next, a predetermined number of the dielectric sheets for forming the second outer layer portion 102, which includes the conductor patterns printed thereon, and a predetermined number of the dielectric sheets for forming the second outer layer portion 102, which includes none of the internal electrode patterns and the conductor patterns, are stacked together. The dielectric sheets for forming the inner layer portion 100, which include the internal electrode patterns printed thereon, are sequentially stacked on the stacked electric sheets for forming the second outer layer portion 102. On the top of the stacked dielectric sheets for forming the inner layer portion 100, a predetermined number of the dielectric sheets for forming the first outer layer portion 101, which include the conductor patterns printed thereon, and a predetermined number of the dielectric sheets for forming the first outer layer portion 101, which include none of the internal electrode patterns and the conductor patterns, are stacked. In this way, a stack of the sheets is fabricated.

Next, the stack of the sheets is pressed in the stacking direction by, for example, hydrostatic pressing, thus producing a multilayer block. Subsequently, the multilayer block is cut into multilayer chips of a predetermined size. At this time, the corners and ridgeline portions of each multilayer chip are rounded by, for example, barrel finishing or the like. Next, the multilayer chips are fired to produce the multilayer bodies 10. The firing temperature is preferably, for example, about 900° C. or higher and about 1400° C. or lower, depending on the materials forming the dielectric layers and the internal electrode layers.

Next, the first end surface LS1 of each multilayer body 10 is dipped into a conductive paste as an electrode material for the base electrode layer, by a dipping method, for example, such that the first end surface LS1 is coated with the conductive paste for forming the first base electrode layer 415. Similarly, the second end surface LS2 of each multilayer body 10 is dipped into a conductive paste as an electrode material for the base electrode layer, by a dipping method, for example, such that the second end surface LS2 is coated with the conductive paste for forming the second base electrode layer 425. Thereafter, these conductive pastes are fired to form the first base electrode layer 415 and the second base electrode layer 425, which are fired layers. The firing temperature is preferably, for example, about 600° C. or higher and about 900° C. or lower.

As described above, the first base electrode layer 415 and the second base electrode layer 425 may be formed as resin layers, by applying a conductive paste including conductive particles and a thermosetting resin by an application method and firing the applied conductive paste. Alternatively, the first base electrode layer 415 and the second base electrode layer 425 may be formed as thin films, by a thin film formation method such as, for example, sputtering or vapor deposition.

Thereafter, the first plated layer 416 is formed on the surface of the first base electrode layer 415, thus forming the first external electrode 41. The second plated layer 426 is formed on the surface of the second base electrode layer 425, thus forming the second external electrode 42. Through the foregoing steps, the multilayer ceramic capacitor 1 described above is produced.

As described above, the multilayer ceramic capacitor 1 according to the present preferred embodiment includes the four conductor portions 511, 512, 521, and 522, each of which includes the plurality of conductor layers 50M and which are respectively arranged in the two outer layer portions 101 and 102 in the two end gap portions LG1 and LG2.

During the step of pressing the multilayer body 10, the conductor portions 511 and 512 pressurize and move the inner layer portion 100 in the end gap portion LG1, that is, the internal electrode layers 30 in the end gap portion LG1, toward the middle in the stacking direction T of the multilayer body 10. Furthermore, during the step of pressing the multilayer body 10, the conductor portions 521 and 522 pressurize and move the inner layer portion 100 in the end gap portion LG2, that is, the internal electrode layers 30 in the end gap portion LG2, toward the middle in the stacking direction T of the multilayer body 10.

As a result, for each of the conductor portions 511, 512, 521, and 522, one conductor layer 50M closest to the middle in the stacking direction T of the multilayer body 10 among the plurality of conductor layers 50M is closer to the middle in the stacking direction T of the multilayer body 10 than one internal electrode layer 30 closest in the stacking direction T to the main surface TS1 or TS2 of the multilayer body 10 among the plurality of internal electrode layers 30. More specifically, in each of the conductor portions 511, 512, 521, and 522, the one conductor layer 50M closest to the middle in the stacking direction includes one end portion A located toward the electrode opposing portion L30, and the one end portion A is closer to the middle in the stacking direction T of the multilayer body 10 than a middle portion B in the length direction L of the one internal electrode layer 30 closest to the main surface TS1 or TS2.

This feature enables, in the first end gap portion LG1, lengthening the distance from the first main surface TS1 and the second main surface TS2 to the inner layer portion 100, i.e., the internal electrode layers 30. Furthermore, this feature enables, in the second end gap portion LG2, lengthening the distance from the first main surface TS1 and the second main surface TS2 to the inner layer portion 100, i.e., the internal electrode layers 30.

As a result, even in the case of ingress of moisture into the multilayer body 10 from an end of the first external electrode 41 or an end of the second external electrode 42, the moisture is prevented from penetrating to reach the inner layer portion 100 of the multilayer body 10, i.e., the internal electrode layers 30. Thus, the moisture resistance of the multilayer ceramic capacitor 1 is improved, and the deterioration of the electrical characteristics of the multilayer ceramic capacitor 1 is prevented or reduced.

Moreover, the level difference between the electrode opposing portion L30 and the first end gap portion LG1 can be reduced, and the level difference between the electrode opposing portion L30 and the second end gap portion LG2 can be reduced.

While preferred embodiments of the present invention have been described above, the present invention is not limited to the preferred embodiments described above, and modifications and variations may be made to the present invention. For example, in the above-described preferred embodiment, the multilayer ceramic capacitor 1 including the external electrodes 40 on the end surfaces LS1 and LS2 in the length direction L of the multilayer body 10 has been described as an example. However, the features of preferred embodiments of the present invention are not limited to this, and are applicable to, for example, a multilayer ceramic capacitor including further external electrodes on the side surfaces WS1 and WS2 in the width direction W of the multilayer body 10. Moreover, the features of preferred embodiments of the present invention may also be applied to the external electrodes formed on the side surfaces WS1 and WS2 in the width direction W of the multilayer body 10. More specifically, the multilayer ceramic capacitor may have a configuration in which conductor portions 50 including a plurality of conductor layers 50M are respectively arranged in the outer layer portions 101 and 102 in the side gap portions WG1 and WG2 in the width direction W of the multilayer body 10, and for each of the conductor portions 50, one conductor layer 50M closest to the middle in the stacking direction T of the multilayer body 10 among the plurality of conductor layers 50M is closer to the middle in the stacking direction T of the multilayer body 10 than one internal electrode layer 30 closest in the stacking direction T to the main surface TS1 or TS2 of the multilayer body 10 among the plurality of internal electrode layers 30.

As illustrated in FIG. 2, the above-described preferred embodiment exemplifies a configuration in which substantially no level difference exists between electrode opposing portion L30 and the end gap portions LG1 and LG2.

Figure 4:
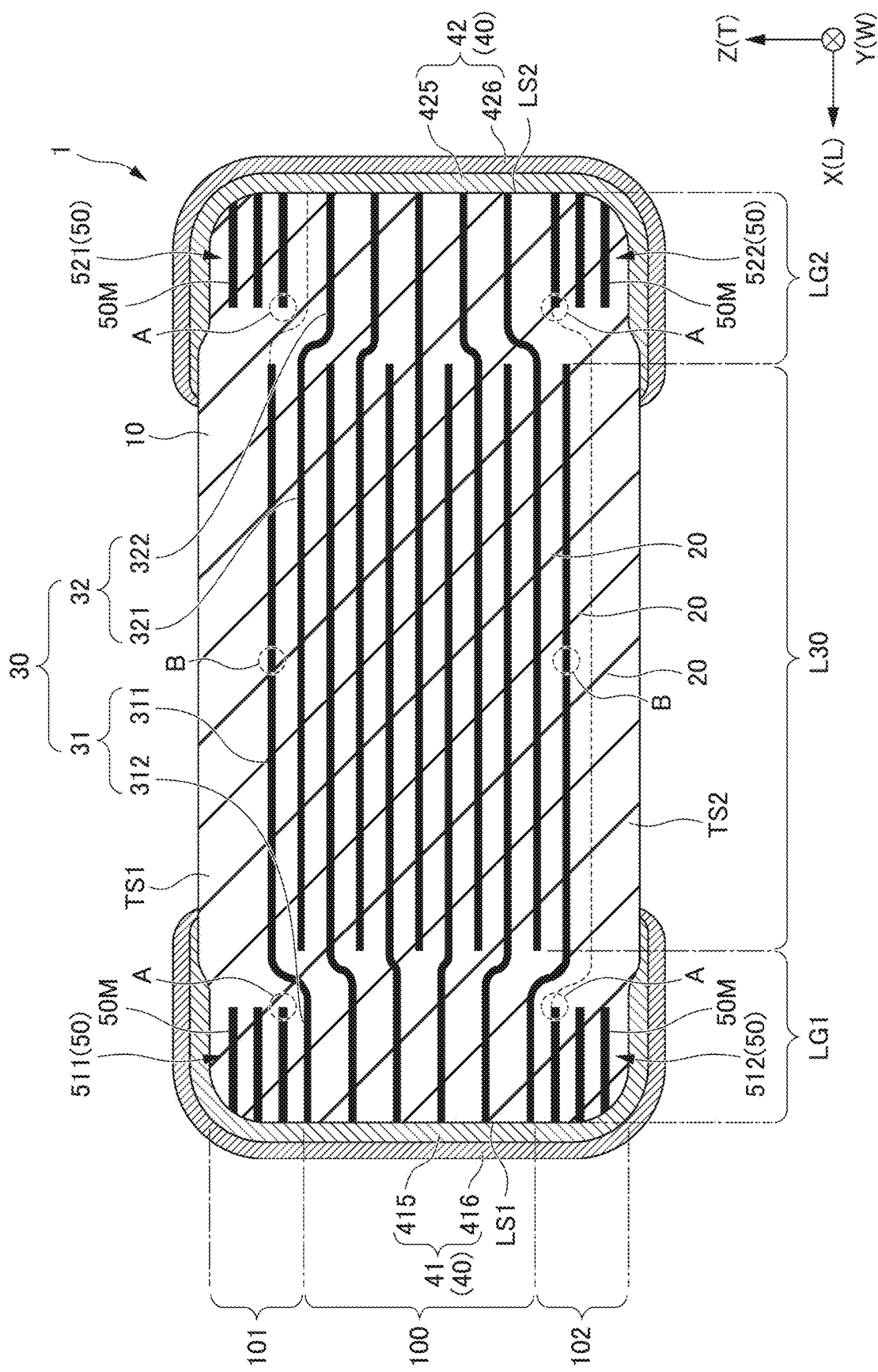
FIG. 4 is an LT cross-sectional view of a multilayer ceramic capacitor according to a modification of a preferred embodiment of the present invention, and is an LT cross-sectional view corresponding to FIG. 2.

However, the features of the present invention are not limited to this. For example, as illustrated in FIG. 4, the level differences between the electrode opposing portion L30 and the end gap portions LG1 and LG2 may remain to a certain extent. In this case, the level differences between the electrode opposing portion L30 and the end gap portions LG1 and LG2 can be reduced by way of the external electrodes 41 and 42, in particular, by way of the base electrode layers 415 and 425.

EXAMPLES

Preferred embodiments of the present invention will be specifically described based on examples. The following examples are not intended to limit the present invention.

Example 1

The same multilayer ceramic capacitors as that of the present preferred embodiment illustrated in FIGS. 1 to 3 were fabricated as Example 1. The main features of the configuration of the multilayer ceramic capacitors of Example 1 were as follows.
    Size of the multilayer body 10: 0.25 mm in the length direction L, about 0.125 mm in width direction W, and about 0.125 mm in the stacking direction T
    Thickness of the dielectric layer 20: about 0.50 μm
    Thickness of the internal electrode layer 30: about 0.45 μm
    Number of the dielectric layers 20, i.e., the internal electrode layers 30 in the inner layer portion 100: 110
    Number of the dielectric layers 20 in the outer layer portions 101 and 102: 8
    Thickness of the conductor layer 50M: about 1.05 μm
    Number of the conductor layers 50M: 6
    Level difference between the electrode opposing portion L30 and the end gap portions LG1 and LG2 of the multilayer body 10: about 5 μm
    Presence or absence of the conductor layers 50M at the ridgeline portions of the multilayer body 10: present Example 2

The multilayer ceramic capacitors of Example 2 differ from those of Example 1 in the thickness and the number of the conductor layers 50M.
    Thickness of the conductor layer 50M: about 1.00 μm
    Number of the conductor layers 50M: 8
    Level difference between the electrode opposing portion L30 and the end gap portions LG1 and LG2 of the multilayer body 10: about 3 μm
    Presence or absence of the conductor layers 50M at the ridgeline portions of the multilayer body 10: present Example 3

The multilayer ceramic capacitors of Example 3 differ from those of Example 1 in the thickness and the number of the conductor layers 50M.
    Thickness of the conductor layer 50M: about 0.95 μm
    Number of the conductor layers 50M: 10
    Level difference between the electrode opposing portion L30 and the end gap portions LG1 and LG2 of the multilayer body 10: about 1 μm
    Presence or absence of the conductor layers 50M at the ridgeline portions of the multilayer body 10: present Comparative Example 1

The multilayer ceramic capacitors of Comparative Example 1 differ from those of Example 1 in that the multilayer ceramic capacitors of Comparative Example 1 did not include the conductor layers 50M.
    Level difference between the electrode opposing portion L30 and the end gap portions LG1 and LG2 of the multilayer body 10: about 10 μm
    Presence or absence of the conductor layers 50M at the ridgeline portions of the multilayer body 10: absent Evaluation To evaluate moisture resistance of the multilayer ceramic capacitors of Examples and Comparative Example, short circuit degradation between the external electrodes was measured with respect to 1000 samples. Specifically, a voltage of about 6.3 V was applied between the external electrodes to measure the leakage current between the external electrodes, and the insulation resistance between the external electrodes was calculated from the measured leakage current. When the calculated insulation resistance between the external electrodes was about 10 kΩ or lower, it was determined that the external electrodes had short-circuited, and the number of multilayer capacitors experiencing the short-circuit degradation between the external electrodes was counted. The evaluation results are shown in Table 1.

TABLE 1

| | Level Difference [um] | Presence or Absence of Conductor Layers at Ridgeline Portions | Thickness of Conductor Layers [um] | Number of Conductor Layers | Number of Capacitors Experiencing Short-Circuit Deterioration |
|---|---|---|---|---|---|
| Comparative Example 1 | 10 | Absent | — | 0 | 10/1000 |
| Example 1 | 5 | Present | 1.05 | 6 | 4/1000 |
| Example 2 | 3 | Present | 1.00 | 8 | 1/1000 |
| Example 3 | 1 | Present | 0.95 | 10 | 0/1000 |

From Table 1, it is clear that arranging the conductor layers 50M in the outer layer portions in the end gap portions of the multilayer body reduces the short-circuit degradation between the external electrodes. Accordingly, the conductor layers 50M arranged as describe above are considered to contribute to the improvement of moisture resistance and to prevention or reduction of the deterioration of the electric characteristics.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
   a multilayer body including a plurality of dielectric layers and a plurality of internal electrode layers that are stacked together in a stacking direction, a first surface and a second surface facing each other in the stacking direction, a third surface and a fourth surface facing each other in a width direction orthogonal or substantially orthogonal to the stacking direction, and a fifth surface and a sixth surface facing each other in a length direction orthogonal or substantially orthogonal to the stacking direction and the width directions; and
   external electrodes respectively on the fifth surface and the sixth surface; wherein
   the plurality of internal electrode layers include first internal electrode layers and second internal electrode layers, the first internal electrode layers being connected to the external electrode on the fifth surface, the second internal electrode layers being connected to the external electrode on the sixth surface;
   the multilayer body includes an inner layer portion including the plurality of the internal electrode layers opposed to each other in the stacking direction with one of the dielectric layers interposed therebetween, and outer layer portions sandwiching the inner layer portion therebetween in the stacking direction;
   the inner layer portion includes an electrode opposing portion and gap portions, the electrode opposing portion being where the first internal electrode layers and the second internal electrode layers face each other in the stacking direction, the gap portions each being located between the electrode opposing portion and the outer layer portions, and the fifth surface and the sixth surface in the length direction; and
   the multilayer body includes conductor portions respectively provided in the outer layer portions corresponding to the gap portions in the stacking direction;
   each of the conductor portions includes a plurality of conductor layers stacked in the stacking direction; and
   one of the plurality of conductor layers at a middle or approximate middle of the multilayer body in the stacking direction includes at least a portion located closer to the middle or approximate middle of the multilayer body in the stacking direction than one of the plurality of internal electrode layers adjacent to one of the outer layer portions of the multilayer body in the stacking direction.

2. The multilayer ceramic capacitor according to claim 1, wherein in each of the conductor portions, the one of the plurality of conductor layers at the middle or approximate middle of the multilayer body in the stacking direction includes one end portion extending toward the electrode opposing portion, the one of the plurality of internal electrode layers adjacent to the one of the outer layer portions of the multilayer body in the stacking direction includes a middle portion extending in the length direction, and the one end portion of the one of the plurality of conductor layers is closer to the middle or approximate middle of the multilayer body in the stacking direction than a middle portion of the one of the plurality of internal electrode layers.

3. The multilayer ceramic capacitor according to claim 1, wherein the plurality of conductor layers include end portions spaced away from the electrode opposing portion and connected to one of the external electrodes.

4. The multilayer ceramic capacitor according to claim 1, wherein in each of the conductor portions, some of the plurality of conductor layers are located at a respective one of ridgeline portions where main surfaces and end surfaces of the multilayer body meet, the ridgeline portions being rounded.

5. The multilayer ceramic capacitor according to claim 1, wherein, in each of the conductor portions, the plurality of conductor layers each have a thickness of about 6 μm or more and about 10 μm or less, and a number of the plurality of conductor layers is 6 or more and 10 or less.

6. The multilayer ceramic capacitor according to claim 5, wherein the plurality of internal electrode layers each have a thickness of about 0.25 μm or more and about 0.45 μm or less, and a number of the plurality of internal electrode layers is 115 or more and 125 or less.

7. The multilayer ceramic capacitor according to claim 6, wherein the plurality of dielectric layers each have a thickness of about 0.40 μm or more and about 0.60 μm or less, and a number of the plurality of dielectric layers is 121 or more and 135 or less.

8. The multilayer ceramic capacitor according to claim 6, wherein the multilayer body has a length of about 250 μm±10 μm in the length direction, a width of about 125 μm±10 μm in the width direction, and a height of about 125 μm±10 μm in the stacking direction.

* * * * *